UNITED STATES PATENT OFFICE.

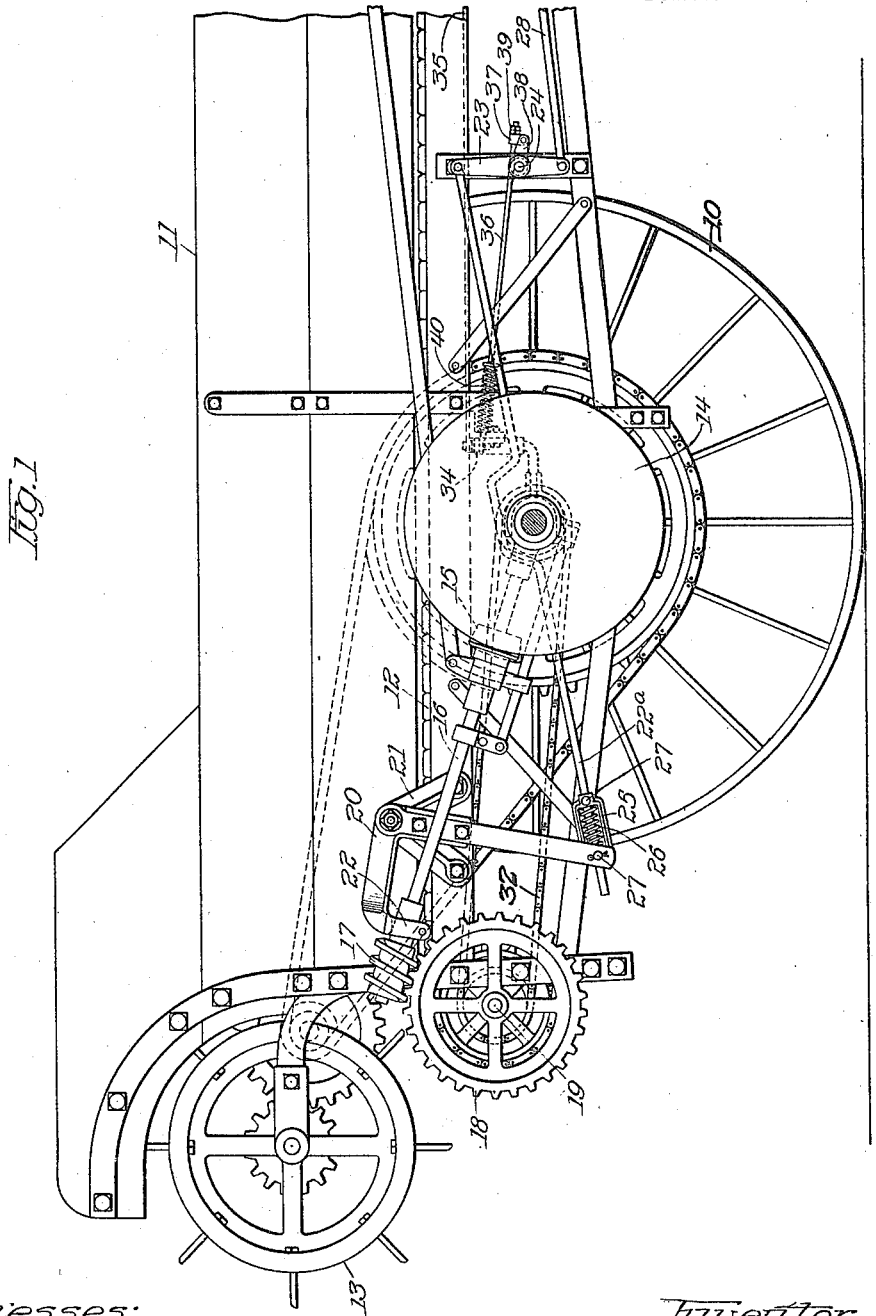

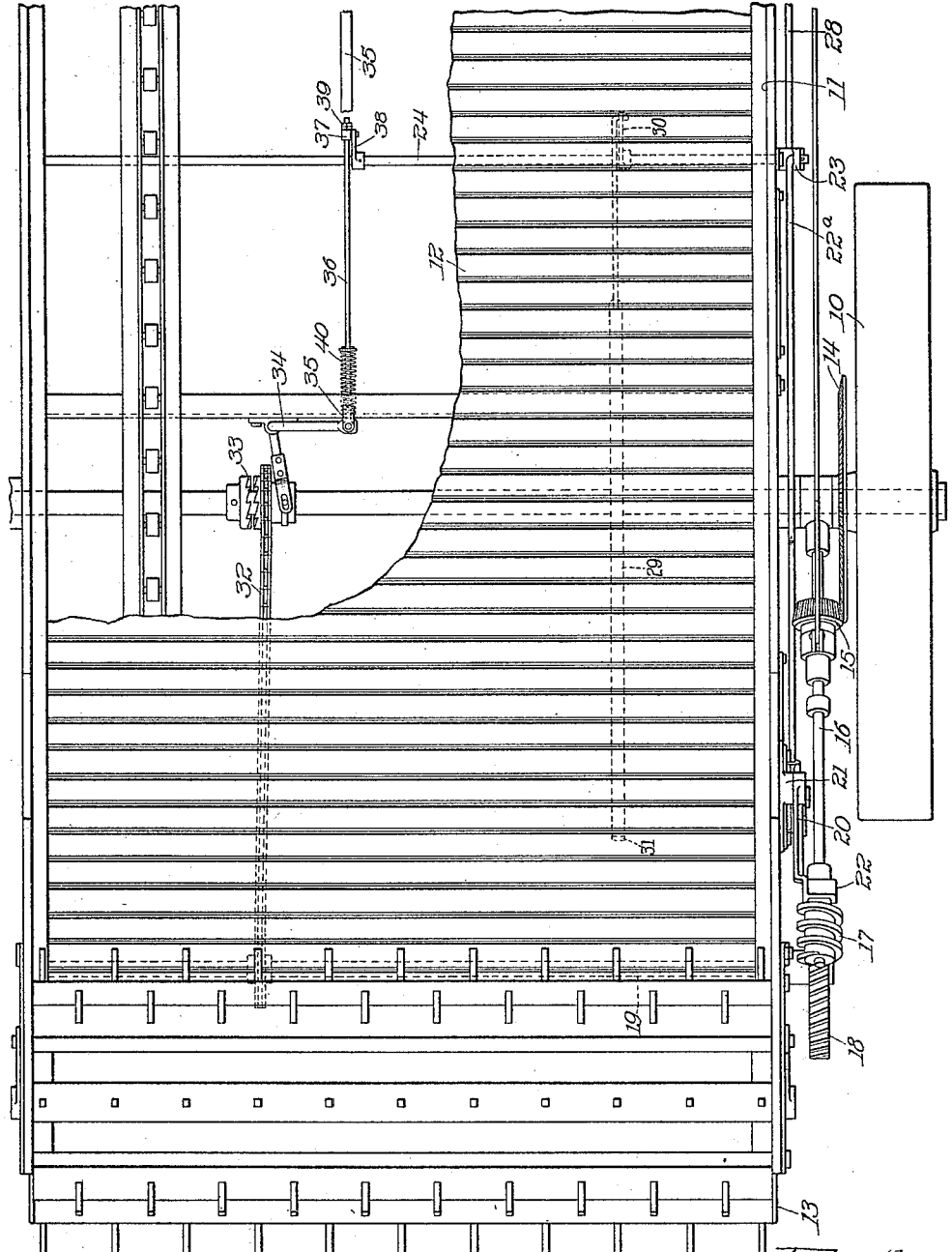

CHARLES W. ROBINSON, OF HAMILTON, ONTARIO, CANADA, ASSIGNOR, BY MESNE ASSIGNMENTS, TO INTERNATIONAL HARVESTER CORPORATION, A CORPORATION OF NEW JERSEY.

FERTILIZER-DISTRIBUTER.

1,231,199.　　　　Specification of Letters Patent.　　Patented June 26, 1917.

Application filed December 1, 1913.　Serial No. 803,962.

*To all whom it may concern:*

Be it known that I, CHARLES W. ROBINSON, a citizen of the United States, residing at Hamilton, in the county of Wentworth, Province of Ontario, Dominion of Canada, have invented certain new and useful Improvements in Fertilizer-Distributers, of which the following is a full, clear, and exact specification.

My invention relates to fertilizer distributers.

It is my object to improve and simplify the construction and operation of a fertilizer distributer of the reverse apron type, with the particular end in view of rendering the shifting of the forward and reverse driving mechanisms thereof safe, certain and positively sequential in operation. This object I accomplish by means of improved shifting devices for the forward and reverse driving mechanisms and by the employment of simple and novel means whereby either one of the driving mechanisms is positively prevented from being moved into operative position when the other one is in position for operating the apron.

One form which my invention may assume is exemplified in the following description and illustrated in the accompanying drawings, in which—

Figure 1 shows a side elevation of the rear portion of a manure spreader embodying my invention; and Fig. 2 shows a plan view of the same with certain parts broken away.

For the purpose of illustrating my device, I have shown a manure spreader of well-known construction comprising rear carrying or traction wheels 10, a receptacle 11, traveling apron 12 operatively connected to the traction wheels, and a beater or distributing cylinder 13 also operated by said wheels.

The traveling apron is of the reverse type as distinguished from the endless type. The forward driving mechanism for the apron includes a driving disk 14 mounted upon the axle of the traction wheels, and a pinion 15 in mesh with the driving disk and movable in a radial direction thereon to obtain variable speeds. A shaft 16 is provided for the pinion 15 and is extended rearwardly, where it has fixed upon its end a pinion or screw 17, which screw is designed to mesh with a worm wheel 18 carried on the apron operating shaft 19. The end of this shaft carrying the screw 17 is made movable toward and from the worm wheel 18 for the purpose of controlling the forward movement of the traveling apron. In this connection I have provided an improved shifting means comprising a bell crank lever 20 pivoted at its angular end to a bracket 21 made fast to the side of the receptacle. On one end of the bell crank lever is formed a fork 22, which fork encompasses in a slidable manner the shaft 16 adjacent to the screw 17. The opposite end of the bell crank lever has a yielding connection with a link 22ª, which link is in turn connected to a crank arm 23 carried upon a transverse rock shaft 24, which rock shaft is a common actuating means for shifting the beater drive as well as for shifting the apron forward drive.

The yielding connection between the bell crank lever and link 22ª comprises a yoke 25 slidably received upon the link and surrounding an expansible coiled spring 26, which spring has its rearward end fixed to the link and its forward end movable thereon and abutting the interior front end of the yoke. On either end of the yoke is a stud 27, which is designed to be inserted in an opening formed in the end of the bell crank lever, and held therein by a cotter pin or otherwise, and thus is completed the connection.

The operation of the shifting means just described is as follows: Through the action of the rock shaft 24 the link 22ª is reciprocated to move the bell crank lever and thereby shift the position of the shaft 16 and its accompanying worm pinion. If the movement of the rock shaft be in a direction to cause engagement of the worm pinion with the wheel 18, the yielding connection comes into use and prevents strains on the parts if, for any reason, the rock shaft is moved a distance beyond what is necessary to make the shift. In many cases it is desired to substitute a smaller worm gear than that shown herein for the purpose of increasing the speed of the apron. When employing a smaller wheel the bell crank lever may be disconnected from the rearward end of the yielding connection and made fast to the stud 27 on the forward end thereof, and in this way the path of movement of the worm shaft and pinion will be changed, and, obviously, the advantages of the yielding connection will still be retained.

It is apparent that the bell crank lever 20 will satisfactorily perform its function and that it comprises a minimum number of parts and is inexpensive in construction. Devices heretofore used for this purpose have usually been complicated in the extreme, cam levers being in general use at this time. To change the path of movement of the worm shaft and its pinion, it has usually been necessary to shift the pivotal point of the cam lever, at much expense of time and trouble; whereas in my device a simple change in the connecting point between the end of the bell crank lever and the link 22ª will accomplish the desired result.

The rock shaft 24 is operated in a well-known manner, either manually or by means of a lever mounted forwardly of the machine and connected to the crank arm 23 by means of a link 28, or automatically, by means of a sliding bar 29 carried rearwardly of the machine below the apron and connected to a crank arm 30 fixed to the rock shaft. This sliding bar operates by reason of an engagement through a lug 31, on its rearward end, with a coacting lug on the front end of the apron, to rotate said rock shaft when the apron is nearing its rearward limit of movement. For returning the apron to its forward position I employ a sprocket gear and chain arrangement 32 between the axle of the carrying wheels and the apron operating shaft. A clutch mechanism 33 is provided for the sprocket gear carried on the axle, one member being fixed to the axle and the other one formed integrally with the gear, which gear is made slidable thereon. A bell crank lever 34 is provided for shifting said gear and its associated clutch member, which lever is connected to a shifting link 35 extending forwardly and having a connection with a foot lever (not shown) mounted near the driver's seat.

The operation of the reverse drive and its shifting means is well understood, the principle being that as the apron approaches its rearward limit of movement through engagement with the sliding bar 29, it moves the rock shaft to disengage the worm pinion and wheel and thereby disconnects itself from the traction wheels, and at the same time it operates to shift the beater driving mechanism out of operative position. The operator then moves the lever connected with the link 35 in a direction to engage the clutch mechanism 33, and thereby the apron is returned to its starting position and, through automatic means or otherwise, the reverse driving mechanism is thrown out of engagement at the proper time, leaving the parts in position for receiving a load. For a further understanding of the operation of this mechanism reference may be had to Patent No. 1,018,743, issued to S. K. Dennis February 27, 1912.

Heretofore in devices of this class the shifting means for the apron forward driving mechanism and the shifting means for the reverse driving mechanism have been made independent of each other and the alertness of the operator has been depended upon to operate them in their proper order. However, it has been found that in many cases where the operator becomes confused there is a grave possibility that both shifting means will be operated at the same time to throw both driving mechanisms into operative position, which, of course, would result in much destruction to the vital parts of the machine. To obviate this danger I have provided a simple device for connecting both shifting means in a manner to render them dependent in their operation, so that when one has been operated to move its associated driving mechanism into working position, the other one will thereby be held positively and securely against movement. This means comprises a link 36 connected to the bell crank lever 34 at one end and at its other, through a swivel joint 37, with a crank arm 38 fixed to the rock shaft 24. The connection between the link 36 and swivel joint, it will be noted, is a slidable one, and nuts 39 are provided upon the link for limiting its movement in one direction. In the construction of this safety device the parts are so arranged that when the rock shaft is in position where the worm pinion will engage the worm wheel for driving the apron forwardly, as shown in Fig. 2, the arm 38 will be directed in a forward position with the swivel joint 37 in engagement with the nuts 39. Therefore, it will be impossible for the operator to move the shifting link 35 in a direction for engaging the reverse clutch 33 without first shifting the worm gear drive out of operative position. The link 36 at its rear end passes through an opening in the transverse frame bar 41 on which the bell crank 34 is mounted, and an expansible coiled spring 40 is arranged on the link 36 abutting the downwardly projecting wing of the transverse frame bar and operates to return said link to position for shifting the clutch members 33 out of engagement. It will also be noted that with the reverse driving clutches in engagement and held therein by the operator, no movement of the rock shaft in a direction to reëngage the worm drive can be effected on account of the relative positions of the link 35 and crank arm 38.

While I have shown and described but one form of my device, it is to be understood nevertheless that it is susceptible of modifications, and therefore that many changes may be resorted to in the details of construction without departing from the spirit of my invention as disclosed in the appended claims.

What I claim as new is:

1. In a fertilizer distributer, a traveling apron, driving mechanism therefor including a shaft and gear movable in a vertical plane, a bell crank mounted on a transverse axis on said distributer and extending below said shaft and gear, and means for actuating said bell crank to yieldingly shift the shaft and gear in a manner to control the operation of the apron.

2. In a fertilizer distributer, a traveling apron, driving mechanism therefor including a driving gear, a member adapted to mesh therewith carried upon a movable shaft, a bell crank connected directly to said shaft and having an arm projecting below, and means connected with said downwardly projecting arm for yieldingly actuating the bell crank to move said member to position for engaging or disengaging the gear.

3. In a fertilizer distributer, a receptacle, a traveling apron therefor, driving mechanism for said apron including a wheel and a member adapted to engage therewith, a movable shaft for said member, a bell crank lever pivoted to said receptacle and slidably engaging at one end with said shaft, and having its other end projecting downwardly, a rock shaft beneath said receptacle, and a yieldable connection between said rock shaft and downwardly extending arm of the bell crank lever whereby said movable shaft is shifted to effect engagement or disengagement between the said wheel and coacting member.

4. In a fertilizer distributer, a receptacle, a traveling apron therefor, driving mechanism for said apron including a movable shaft and a gear for controlling the operation thereof, a bell crank lever for operating said shaft and gear, a rock shaft on said receptacle, a link connecting said rock shaft with the bell crank lever, and a flexible connection between said link and bell crank lever provided with means spaced apart to receive said bell crank lever to thereby provide for a variable path of movement for said bell crank lever.

5. In a fertilizer distributer, a receptacle, forward driving mechanism therefor, reverse driving mechanism, shifting means for said forward drive, a rock shaft for operating said shifting means, a bell crank lever for shifting the reverse driving mechanism in and out of operative position, a crank arm carried on said rock shaft, and a rod connected to said bell crank lever and having a sliding swivel connection with said crank arm.

6. In a fertilizer distributer, a traveling apron, forward driving mechanism therefor, reverse driving mechanism, shifting means for said forward driving mechanism, shifting means for the reverse driving mechanism, a rock shaft for actuating the first mentioned shifting means, a link connected with said second mentioned shifting means and extending forwardly and manually controlled, and a permanent slidable connection between the rock shaft and reverse shifting means whereby the movement of one of said driving mechanisms into operative position is prevented when the other one is in operation.

7. In a fertilizer distributer, a traveling apron, forward driving mechanism therefor, reverse driving mechanism, shifting means for both of said drives, a rock shaft for operating the forward drive shifting mechanism, and a crank arm carried on said rock shaft and having a sliding pivotal connection with the reverse drive shifting mechanism whereby a movement of one of said driving mechanisms into operative position is positively prevented when the other one is in operation.

8. In a fertilizer distributer, a traveling apron, forward driving mechanism therefor, shifting means for said driving mechanism, reverse driving mechanism, shifting means for said reverse driving mechanism, a rock shaft for operating said forward drive, shifting means operated by the travel of the apron for actuating said rock shaft, and means on said rock shaft having a slidable connection with the reverse gear shifting means whereby either of said driving mechanisms is positively prevented from assuming an operative position when the other one is in position for operation.

9. In a fertilizer distributer, a traveling apron, forward driving mechanism therefor including a movable shaft and gear for controlling the forward movement thereof, a bell crank lever connected with said shaft, a rock shaft having a connection with said bell crank lever, reverse driving mechanism for said apron, a second bell crank lever for shifting said reverse driving mechanism, and a slidable connection between said last mentioned bell crank lever and the rock shaft whereby either of said driving mechanisms is positively prevented from assuming an operative position when the other one is in position for driving the apron.

In testimony whereof I affix my signature, in the presence of two witnesses.

CHARLES W. ROBINSON.

Witnesses:
A. W. TORY,
G. J. KELDON.